United States Patent [19]

Scoville et al.

[11] Patent Number: 4,986,802
[45] Date of Patent: Jan. 22, 1991

[54] PLANETARY GEAR BOX FOR A JACK

[75] Inventors: John R. Scoville, Butler; Darryl L. Engel, LaOtto, both of Ind.

[73] Assignee: Universal Tool & Stamping Co., Inc., Butler, Ind.

[21] Appl. No.: 361,427

[22] Filed: Jun. 5, 1989

[51] Int. Cl.⁵ .................... F16H 3/70; F16H 57/02
[52] U.S. Cl. ........................ 475/346; 475/334
[58] Field of Search ............ 475/346, 317, 334, 347; 74/406

[56] References Cited

U.S. PATENT DOCUMENTS

| | | | |
|---|---|---|---|
| 2,027,655 | 1/1936 | Stoeckicht | 475/346 X |
| 2,591,734 | 4/1952 | Smith et al. | 475/346 |
| 3,080,775 | 3/1963 | Fritsch | 475/346 |
| 3,289,488 | 12/1966 | Breuer | 475/346 X |
| 3,518,897 | 7/1970 | Bixby | 475/346 X |
| 3,756,095 | 9/1973 | McCay, Jr. et al. | 475/346 |
| 4,103,565 | 8/1978 | Matikainen et al. | 475/346 X |
| 4,106,366 | 8/1978 | Altenbokum et al. | 475/347 X |
| 4,114,479 | 9/1978 | Ashfield | 475/346 X |
| 4,359,914 | 11/1982 | Meisel, Jr. | 475/346 |
| 4,590,811 | 5/1986 | Kasubuchi | 475/346 X |

Primary Examiner—Dwight Diehl
Attorney, Agent, or Firm—Hill, Van Santen, Steadman & Simpson

[57] ABSTRACT

An improved planetary gear box for a heavy duty truck jack which includes a planetary gear box that provides high torque and in-line input and output shafts and a high gear ratio and a compact package which does not require many precision machine parts. The invention uses parts formed by stamping rather than machining and uses a floating ring gear which can move relative to the housing, thus, allowing a stamped ring gear to be utilized. Floating planetary gears are used by providing slotted carriers whic allow the planet gears to float which eliminates concentric problems with the planet gears and the carrier assembly. The invention allows the use of a stamped housing and the rear carrier of the planet gears is staked to the drive pilot of the jack screw. The invention results in an improved and less expensive jack than utilized in the prior art.

3 Claims, 2 Drawing Sheets

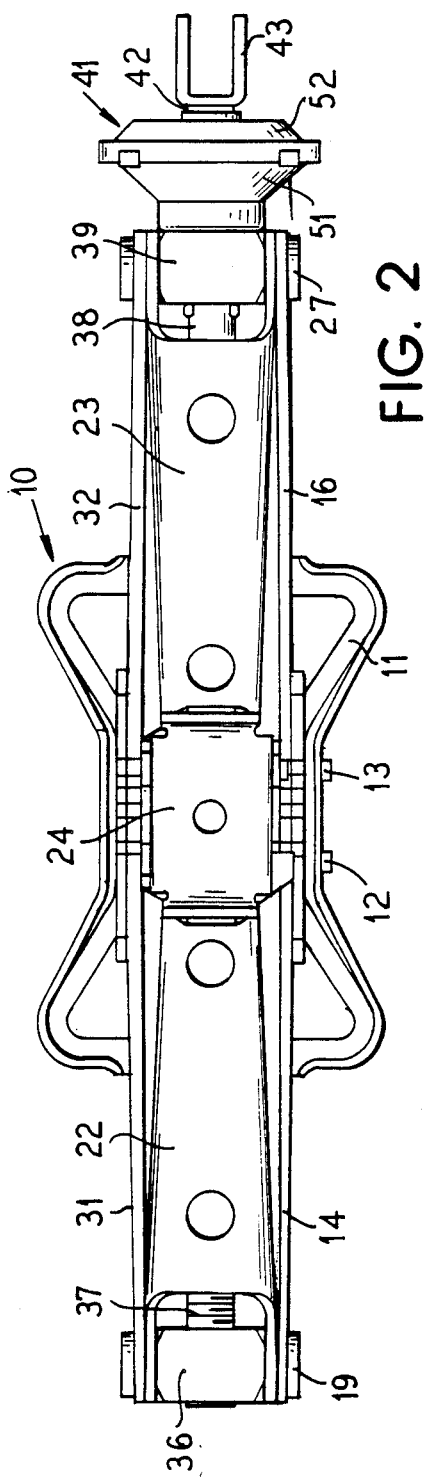
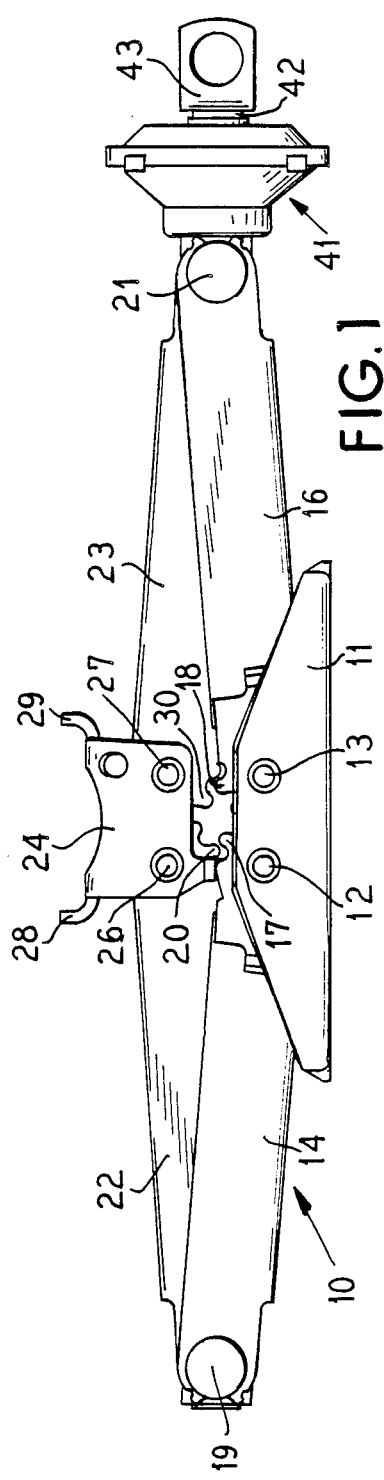

PLANETARY GEAR BOX FOR A JACK

BACKGROUND OF THE INVENTION

1. Field of the Invention

The present invention relates to an improved planetary gear box for a heavy duty truck jack and in particular to a novel planetary gear box.

2. Description of the Related Art

Planetary gear boxes when compared with other parallel shaft gear boxes have the advantages of high torque capacity, in-line input and output shafts and high gear ratio in a compact package. However, it is a disadvantage of prior art planetary gear boxes in that they require many precision machine parts which are very costly.

SUMMARY OF THE INVENTION

It is an object of the present invention to provide an improved planetary gear box for a heavy duty truck jack which provides the advantages of a planetary gear box, but is much less expensive than prior art devices. The present invention allows stamped parts rather than machine parts to be utilized in the planetary gear box. Since stamp parts are not as dimensionally accurate as machine parts, they cannot normally be used in conventional designed planetary gear boxes. It is an object of the present invention to provide a floating ring gear. With planetary gear boxes, the sun gear, planet gears and ring gears all run concentric with each other. Any inaccuracies in these parts or the supporting housing results in a binding action that causes the planetary gear box to run hard and fail before the required number of cycles of the utilization device such as a jack are obtained. If the binding is severe, the planetary gear box simply will not turn.

The present invention provides a ring gear which is allowed to float and which can be formed by stamping. By allowing the ring gear to float relative to the housing, this eliminates concentric problems with the ring gear and allows the use of a stamped ring gear which is less costly than a machine ring gear.

Normally, the ring gear in a conventional construction is attached to the housing by bolts, rivets or dowel pins. In the present invention, the ring gear is allowed to float relative to the housing, but raised bosses are formed in the front housing which engage the ring gear and prevent it from rotating relative to the housing while still allowing it to float. In prior art structures, fasteners are used to hold the ring gear and housing together and the present invention eliminates the cost of the fasteners.

The invention provides for the use of slotted carriers which allow the planet gears to float. This eliminates concentric problems with the planet gears and the carrier assembly by allowing the screw-carrier assembly to have concentric run out without any detrimental effect to the life or operation of the planetary gear box. This reduces the cost in a number of ways. By using a hotheaded screw, allows the elimination of the secondary machining operation normally required on the drive pilot to remove run out between the drive pilot and the bearing area. In the invention, stamped carriers are used instead of machined carriers. The slotted carriers allow the planet gear axle assemblies to be inserted radially into the carrier assembly. Conventional devices require the radially insert of the planet gears and then the insertion of the axis through holes in the carrier.

Conventional planetary gear boxes have cast or forged housings. Such housings require secondary machining operations. In the present invention stamped housings are used which do not require any secondary operations. The stamped housings incorporate raised bosses which restrain the ring gear from rotating. These raised bosses also establish the clearance required to allow the ring gear to float.

The invention provides stamped housings which incorporate corner tabs that are used to fasten the two housings together. This totally eliminates fasteners on the housing.

In the present invention, rivets are extruded on the rear carrier which provide a method for aligning the front and rear carrier of the planet gears. The extruded rivets also provide means for fastening the front and rear carriers together by staking which also eliminates additional fasteners.

In the invention, the rear carrier is staked to the drive pilot of the screw of the jack and this increases torque capacity and eliminates fasteners of the assembly.

The planetary gear box of the invention can be assembled from the front and this can be accomplished due to the large center hole in the front carrier. This allows the sun gear assembly to be inserted into the carrier screw assembly which allows the planetary gear box to be easily and inexpensively assembled.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side plan view illustrating the jack of the invention with the planetary gear box;

FIG. 2 is a top plan view of the jack of FIG. 1;

DESCRIPTION OF THE PREFERRED EMBODIMENTS

Figure 3:
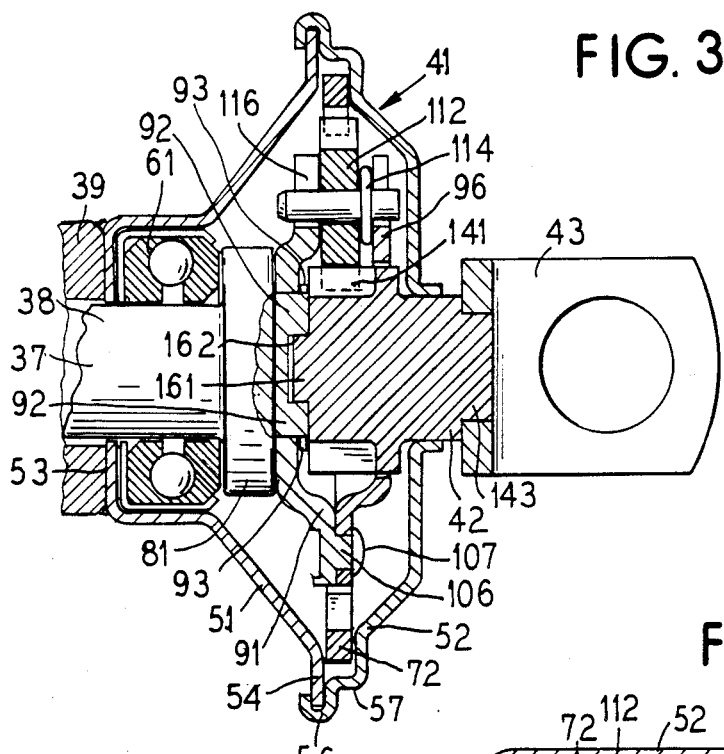
FIG. 3 is a sectional view through the planetary gear box.

FIGS. 1 and 2 illustrate, respectively, in side and top view the improved truck jack of the invention which incorporates the planetary gear box of the invention.

The jack 10 has a base 11 through which a pair of pivot pins 12 and 13 extend that rotatably support a first pair of links 14 and 16 and a second pair of links 31 and 32. The opposite ends of the links 14, 16 and 31 and 32 are connected by pivot pins 19 and 21 to upper links 22 and 23. The ends of the links 14, 16, 31 and 32 adjacent the base 11 are formed with gears as, for example, gear teeth 17 and 18 which mesh together in a conventional manner. The upper links 22 and 23 are formed with gear teeth 20 and 30 which mesh together. An upper support 24 is provided with pivot pins 26 and 27 which extend through the links 22 and 23. Support member 24 has extensions 28 and 29 to engage portions of a truck, for example.

As best shown in FIG. 2, a threaded collar 36 is connected to the pivot pin 19 and a transverse threaded opening receives the screw 37 of the jack. It is to be realized that the collar 36 is integrally formed with the pivot pin 19 so that collar has extensions on each end which pivotally support the links 14, 31 and 22. The other end 38 of the screw 37 passes through a member 39 which has opposite ends which form the pin 27.

Figure 4:
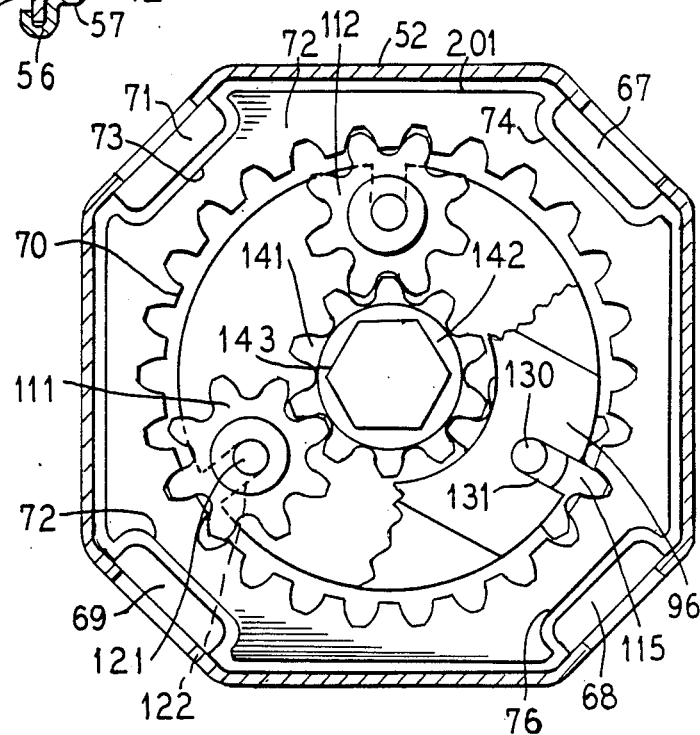
FIG. 4 is a sectional view through the gear box.
Figure 5:
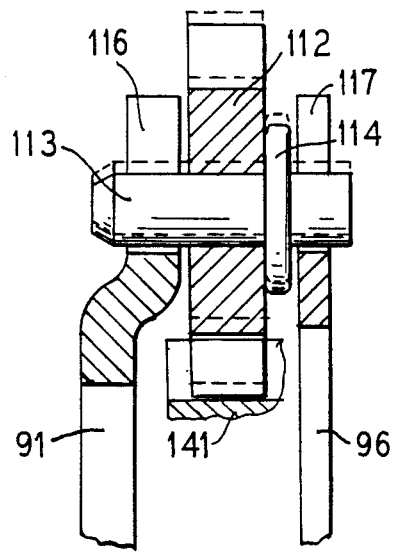
FIG. 5 is a partially cut-away detail illustrating the front and rear carrier for the planet gears.

The improved planetary gear box 41 of the invention is non-rotatably connected to the member 39 as, for example, by welding as shown in FIG. 3. A clevis 43 of general U-shaped and formed with openings as shown in FIG. 1 is adapted to be engaged by a handle so as to actuate the jack by rotating the clevis 43. The clevis is formed with a hexagonal opening for receiving a mating hexagonal extension 143 of the sun gear 142 which is formed with sun gear teeth 141. As shown in FIGS. 3 and 4, the ring gear 72 is formed with internal teeth 70 and its outer contour is generally square-shaped and has notches 73, 74, 76 and 77 formed in its corners. The planetary gear box 41 has a front housing member 52 and a rear housing member 51 which enclose the ring gear 72 in a loose manner so that the ring gear 72 can move relative to the housing members 51 and 52 but cannot rotate relative thereto. So as to prevent rotation, tabs 67, 68, 69 and 71 extend from the housing members 51 and 52 into the openings 73, 74, 76 and 77, respectively, of the ring gear 72. The housing members 51 and 52 are connected together by bending the outer portions of member 52 over the outer portion 54 of the member 51 to form a joint 56 as shown in FIG. 3. As best shown in FIGS. 3, 4 and 5, a front planet gear carrier 96 rotatably supports three planet gears 111, 112 and 115 which are shown in FIG. 4. Planet gears 111, 112 and 115 have teeth which engage the teeth 141 of sun gear 142 and also which engage the teeth 70 of the ring gear 72 as shown in FIG. 4. The rear carrier 91 for the planet gears 111, 112 and 115 and the front carrier 96 are formed with slots such as 116 and 117 shown in FIG. 5 into which the planet axle 113 of gear 112 is received. An axle retaining flange 114 is mounted on the planet axle 113 between the front carrier 96 and the gear 112 as shown in FIG. 5.

As best shown in FIG. 4, the gears 111 and 115 are mounted on planet axles 121 and 130, respectively, which are received in slots 122 and 131 formed in the front and rear carriers 96 and 91 so as to allow the planet gears to float relative to the housing. The rear carrier 91 is formed with extruded rivets 106 which extend through aligned openings in the front carrier 96 and the rivets are then staked so as to form heads 107 to lock the members 91 and 96 together.

The rear carrier 91 is formed with a center opening 162 into which an extension 161 of the sun gear 142 is rotatably received.

The screw 37 has a front portion 38 which is nonrotatably connected to the rear carrier 91 of the planet gears. A collar portion 81 bears against the rear carrier 91 and an extending portion 92 extends through the rear carrier and is staked to the rear carrier so as to form an extension 93 which locks the screw 37 to the rear carrier 91 as shown.

A bearing 61 is mounted in the housing comprising the members 51 and 52 around the front portion 38 of the screw 37 so that the screw 38 is rotatably supported by the rear housing 51 and the member 39. The ring gear 72 may be a stamped member and may be generally square-shaped with truncated corners in which notches are formed.

In use, the jack is placed under a truck or other vehicle to be lifted and the clevis 43 is rotated with a suitable handle. As the clevis rotates, it turns the sun gear 41 which drives the planet gears 111, 112 and 115 which mate with the teeth 70 of the ring gear 72 which causes the front carrier 96 and the rear carrier 91 to rotate relative to the housing 51-52. As the rear carrier 91 rotates, it rotates the screw 37 since it is staked thereto causing the screw to rotate relative to the threaded bearing member 36. As the screw 37 rotates, it pulls the outer ends of the links 14, 16, 31, 32, 22 and 23 together which causes the jack to lift the vehicle.

Due to the space 201 illustrated in FIG. 4 between the ring gear 72 and the housing 52, the ring gear 72 can move thus allowing the use of a stamped ring gear. The tabs 68, 69, 67 and 71 prevent the ring gear from rotating in the housing 52. Due to the slots such as slots 116 and 117, the planet gears 112, 111 and 115 can move radially relative to the sun gear 41 in the front carrier 96 and the rear carrier 91. Thus, the invention allows a planet gear box to be constructed using stamped parts rather than machine parts thus resulting in a less expensive unit.

Although the invention has been described with respect to preferred embodiments, it is not to be so limited as changes and modifications can be made which are within the full intended scope of the invention as defined by the appended claims.

We claim as our invention:

1. A planetary gear box for a jack comprising, a hollow housing, a ring gear loosely mounted in said hollow housing so that said ring gear can move relative to said housing but is restrained from rotating relative to said housing, a planet gear carrier mounted in said hollow housing, a plurality of planet gears rotatably supported by said planet gear carrier and said planet gears in mesh with relative to said housing and non-rotatably attached to said sun gear, and a second shaft extending into said hollow housing and rotatably mounted relative to said housing and non-rotatably attached to said planet gear carrier, wherein said ring gear is formed with at least one notch and said hollow housing is formed with at least one extension which fits into said notch, wherein said hollow housing is formed of a first and second stamped members which are joined at their outer edges by bending said first member over the second member to lock said first and second members together, and wherein said ring gear is a stamped member and is generally square shaped with truncated corners in which said notches are formed.

2. A planetary gear box for a jack comprising, a hollow housing, a ring gear loosely mounted in said hollow hosing so that said ring gear can move relative to said housing but is restrained from rotating relative to said housing, a planet gear carrier mounted in said hollow housing, a plurality of planet gears rotatably supported by said planet gear carrier and said planet gears in mesh with said ring gear, a sun gear mounted in said hollow housing and in mesh with said plurality of planet gears, a first shaft extending into said hollow housing and rotatably mounted relative to said housing and non-rotatably attached to said sun gear, and a second shaft extending into said hollow housing and rotatably mounted relative to said housing and non-rotatably attached to said planet gear carrier, wherein said first and second shafts are axially aligned, wherein said planet gears are mounted in said planet carrier so that said planet gears can move in the radial direction relative to said first and second shafts to allow said planet gears to self-center between said sun and ring gears, and wherein said planet gear carrier is formed of first and second members which are connected together and a plurality off aligned radial slots formed in said first and second members and a plurality of planet gear shafts each slidably received in one of said plurality of said radial slots and each of said plurality of planet gears mounted on one of said plurality of planet gear shafts.

3. A planetary gear box according to claim 2 wherein said first planet gear carrier member is formed with extending rivets which extend through openings formed in said second planet gear member and said rivets are staked to lock said members together.

* * * * *

UNITED STATES PATENT AND TRADEMARK OFFICE
CERTIFICATE OF CORRECTION

PATENT NO. : 4,986,802

DATED : January 22, 1991

INVENTOR(S) : Scoville et al

It is certified that error appears in the above—identified patent and that said Letters Patent is hereby corrected as shown below:

Column 5, Claim 2, line 6, "off aligned" should read --of aligned--.

Signed and Sealed this

Tenth Day of November, 1992

Attest:

DOUGLAS B. COMER

*Attesting Officer*     *Acting Commissioner of Patents and Trademarks*